(12) United States Patent
Bell et al.

(10) Patent No.: US 8,262,109 B1
(45) Date of Patent: Sep. 11, 2012

(54) STEERING SYSTEM FOR A ZERO-TURN RADIUS VEHICLE

(75) Inventors: Douglas W. Bell, Mattoon, IL (US); Bryce E. Steenburg, Mattoon, IL (US)

(73) Assignee: Hydro-Gear Limited Partnership, Sullivan, IL (US)

(*) Notice: Subject to any disclaimer, the term of this patent is extended or adjusted under 35 U.S.C. 154(b) by 0 days.

(21) Appl. No.: 13/372,684

(22) Filed: Feb. 14, 2012

Related U.S. Application Data (60) Division of application No. 13/224,801, filed on Sep. 2, 2011, now Pat. No. 8,152,183, which is a continuation of application No. 12/234,130, filed on Sep. 19, 2008, now Pat. No. 8,011,678.

(60) Provisional application No. 60/973,831, filed on Sep. 20, 2007.

(51) Int. Cl.
*B62D 13/04* (2006.01)

(52) U.S. Cl. ............... 280/93.506; 280/93.502; 280/98; 280/93.51; 280/103

(58) Field of Classification Search ............ 280/93.506, 280/93.502, 93.51, 98, 103; 180/409, 408; 16/18 R
See application file for complete search history.

(56) References Cited

U.S. PATENT DOCUMENTS

| | | | | | |
|---|---|---|---|---|---|
| 239,432 | A | * | 3/1881 | Bollee | 180/303 |
| 620,968 | A | * | 3/1899 | Riker | 180/375 |
| 935,610 | A | * | 9/1909 | Mauksch | 280/93.513 |
| 1,450,528 | A | * | 4/1923 | Varney | 24/135 R |
| 1,748,061 | A | * | 2/1930 | Claude | 280/93.513 |
| 2,154,055 | A | * | 4/1939 | Schurr | 451/47 |
| 2,208,358 | A | * | 7/1940 | Chandler | 248/540 |
| 2,381,331 | A | * | 8/1945 | Ayers | 439/791 |
| 2,423,266 | A | * | 7/1947 | Stokes | 180/262 |
| 2,466,901 | A | * | 4/1949 | Krueger | 439/811 |
| 2,628,848 | A | | 9/1953 | Isaac | |
| 2,763,493 | A | * | 9/1956 | Hutchinson | 280/99 |
| 2,915,319 | A | | 12/1959 | Kumler et al. | |
| 3,040,827 | A | * | 6/1962 | Ulinski | 180/6.5 |
| 3,069,183 | A | * | 12/1962 | Williamson | 280/93.506 |
| 3,077,354 | A | * | 2/1963 | Rateau | 280/99 |

(Continued)

FOREIGN PATENT DOCUMENTS

DE 4224359 C1 5/1993

(Continued)

OTHER PUBLICATIONS

International Search Report completed on Mar. 24, 2010 with respect to International Publication No. WO 2010/011625 A3.

(Continued)

*Primary Examiner* — Paul N Dickson
*Assistant Examiner* — Nicole Verley
(74) *Attorney, Agent, or Firm* — Neal, Gerber & Eisenberg LLP (57) ABSTRACT

A steering apparatus for a zero-turn radius vehicle using a steering mechanism coupled to a first set of wheel assemblies by a plurality of cables. User input to the steering mechanism causes the cables to turn the first set of wheel assemblies about a vertical axis. Specifically, the cables link the steering mechanism to cam mechanisms that are attached to each wheel assembly. The design of the cam mechanism, which preferably includes two cams of varying radii, enables the two wheel assemblies to rotate about their vertical axes at varied degrees of rotation and greater than ninety degrees from the forward facing position, thereby resulting in zero-turn radius capability.

19 Claims, 9 Drawing Sheets

U.S. PATENT DOCUMENTS

| | | | |
|---|---|---|---|
| 3,190,994 A * | 6/1965 | Becker et al. | 200/61.85 |
| 3,297,930 A | 1/1967 | Payne | |
| 3,559,020 A | 1/1971 | Imaizumi et al. | |
| 3,613,482 A | 10/1971 | Benson, Jr. et al. | |
| 3,669,466 A * | 6/1972 | Spence | 180/409 |
| 3,732,671 A | 5/1973 | Allen et al. | |
| 3,789,940 A | 2/1974 | Burton | |
| 3,809,975 A | 5/1974 | Bartels | |
| 3,820,811 A * | 6/1974 | Lapham | 280/99 |
| 3,914,938 A | 10/1975 | Cornell et al. | |
| 3,970,160 A | 7/1976 | Nowick | |
| 4,008,783 A | 2/1977 | Herrmann et al. | |
| 4,023,434 A | 5/1977 | Axelsson | |
| 4,023,637 A | 5/1977 | Jackovich | |
| 4,140,031 A | 2/1979 | Sibeud et al. | |
| 4,175,728 A | 11/1979 | Ferguson | |
| 4,186,816 A | 2/1980 | Pfundstein | |
| 4,196,785 A | 4/1980 | Downing, Jr. | |
| 4,271,728 A | 6/1981 | Wakamatsu | |
| 4,289,214 A * | 9/1981 | Spence | 180/234 |
| 4,446,941 A | 5/1984 | Laurich-Trost | |
| 4,449,598 A | 5/1984 | Hones et al. | |
| 4,493,228 A | 1/1985 | Vukovich et al. | |
| 4,557,343 A | 12/1985 | Pickering | |
| 4,567,969 A | 2/1986 | Makita | |
| 4,587,808 A | 5/1986 | Watanake et al. | |
| 4,691,148 A | 9/1987 | Nicholls et al. | |
| 4,802,546 A | 2/1989 | Sakikawa et al. | |
| 4,817,471 A | 4/1989 | Tury et al. | |
| 4,827,721 A | 5/1989 | Hayashi et al. | |
| 4,841,793 A | 6/1989 | Leigh-Monstevens et al. | |
| 4,852,679 A * | 8/1989 | Fry | 180/234 |
| 4,875,390 A | 10/1989 | Hayashi et al. | |
| 4,881,612 A | 11/1989 | Yano et al. | |
| 4,897,942 A * | 2/1990 | Klas et al. | 37/244 |
| 4,914,592 A | 4/1990 | Callahan et al. | |
| 4,922,769 A | 5/1990 | Tury et al. | |
| 4,934,726 A * | 6/1990 | Daenens et al. | 280/408 |
| 4,950,126 A * | 8/1990 | Fabiano et al. | 414/590 |
| 4,957,183 A * | 9/1990 | Mullett et al. | 180/234 |
| 4,998,450 A | 3/1991 | Nogle | |
| 5,014,038 A | 5/1991 | Leigh-Monstevens et al. | |
| 5,033,763 A * | 7/1991 | Daenens et al. | 280/426 |
| 5,064,010 A | 11/1991 | Masbruch et al. | |
| 5,078,222 A | 1/1992 | Hauser et al. | |
| 5,090,512 A * | 2/1992 | Mullet et al. | 180/236 |
| RE34,057 E | 9/1992 | Middlesworth | |
| RE34,064 E | 9/1992 | Tury et al. | |
| 5,147,010 A | 9/1992 | Olson et al. | |
| 5,154,437 A | 10/1992 | Inagaki et al. | |
| 5,174,593 A * | 12/1992 | Chapman | 280/47.11 |
| 5,249,422 A | 10/1993 | Smith et al. | |
| 5,314,387 A | 5/1994 | Hauser et al. | |
| 5,335,750 A | 8/1994 | Geringer et al. | |
| 5,450,054 A | 9/1995 | Schmersal | |
| 5,481,460 A | 1/1996 | Madaki et al. | |
| 5,489,828 A | 2/1996 | Palleggi | |
| 5,502,957 A | 4/1996 | Robertson | |
| 5,529,135 A | 6/1996 | Wenzel et al. | |
| 5,542,251 A | 8/1996 | Leibing et al. | |
| 5,547,038 A | 8/1996 | Madwed | |
| 5,606,892 A | 3/1997 | Hedderly | |
| 5,741,202 A | 4/1998 | Huber | |
| 5,743,347 A | 4/1998 | Gingerich | |
| 5,931,244 A | 8/1999 | Renfroe et al. | |
| 5,957,497 A | 9/1999 | Johansson et al. | |
| 5,996,723 A * | 12/1999 | Shimizu et al. | 180/444 |
| 6,012,540 A | 1/2000 | Bohner et al. | |
| 6,082,084 A | 7/2000 | Reimers et al. | |
| 6,089,341 A | 7/2000 | Gingerich | |
| 6,109,626 A * | 8/2000 | Chapman | 280/47.11 |
| 6,125,963 A * | 10/2000 | Staiger | 180/411 |
| 6,135,465 A * | 10/2000 | Chapman | 280/47.11 |
| 6,138,069 A | 10/2000 | Ellertson et al. | |
| 6,152,255 A | 11/2000 | Noro et al. | |
| 6,184,637 B1 | 2/2001 | Yamawaki et al. | |
| 6,213,249 B1 | 4/2001 | Noro et al. | |
| 6,223,852 B1 | 5/2001 | Mukai et al. | |
| 6,226,580 B1 | 5/2001 | Noro et al. | |
| 6,260,655 B1 | 7/2001 | Mukai et al. | |
| 6,286,621 B1 | 9/2001 | Mukai et al. | |
| 6,295,887 B1 | 10/2001 | DeJonge et al. | |
| 6,298,941 B1 | 10/2001 | Spadafora | |
| 6,354,394 B1 * | 3/2002 | Bauer-Nilsen | 180/409 |
| 6,401,559 B1 * | 6/2002 | Grottesi | 74/333 |
| 6,408,972 B1 | 6/2002 | Rodgers et al. | |
| 6,484,838 B1 | 11/2002 | Borsting et al. | |
| 6,501,023 B2 | 12/2002 | Tsunoda et al. | |
| 6,520,274 B1 | 2/2003 | McElmeel, Jr. et al. | |
| 6,520,642 B1 * | 2/2003 | Chapman | 352/243 |
| 6,591,927 B1 | 7/2003 | Honekamp et al. | |
| 6,609,357 B1 | 8/2003 | Davis et al. | |
| 6,717,281 B1 | 4/2004 | Brandon et al. | |
| 6,755,461 B2 | 6/2004 | Saeksaria et al. | |
| 6,775,976 B1 | 8/2004 | Phanco et al. | |
| 6,817,437 B2 | 11/2004 | Magnus et al. | |
| 6,955,046 B1 | 10/2005 | Holder et al. | |
| 6,957,926 B2 * | 10/2005 | Okuda | 403/374.3 |
| 6,962,219 B2 | 11/2005 | Hauser | |
| 6,968,919 B2 * | 11/2005 | Shimizu et al. | 180/444 |
| 7,003,950 B1 | 2/2006 | Holder et al. | |
| 7,024,853 B1 | 4/2006 | Holder et al. | |
| 7,073,330 B1 * | 7/2006 | Hauser | 60/487 |
| RE39,255 E | 9/2006 | Ishii et al. | |
| 7,134,276 B1 | 11/2006 | Langenfeld et al. | |
| 7,140,640 B2 | 11/2006 | Tronville et al. | |
| 7,165,398 B1 | 1/2007 | Holder et al. | |
| 7,172,041 B2 | 2/2007 | Wuertz et al. | |
| 7,237,629 B1 * | 7/2007 | Bland et al. | 180/6.24 |
| 7,617,890 B2 * | 11/2009 | Romig | 180/6.48 |
| 7,665,748 B2 * | 2/2010 | Okada | 280/99 |
| 7,735,845 B2 * | 6/2010 | Snow | 280/93.51 |
| 8,011,678 B1 * | 9/2011 | Bell et al. | 280/98 |
| 8,152,183 B1 * | 4/2012 | Bell et al. | 280/98 |
| 2004/0103659 A1 | 6/2004 | Johnson et al. | |
| 2005/0057031 A1 | 3/2005 | Ahnafield | |
| 2007/0063502 A1 * | 3/2007 | Greig et al. | 280/771 |
| 2008/0018269 A1 | 1/2008 | Wyatt et al. | |
| 2008/0184687 A1 * | 8/2008 | Scherbring et al. | 56/10.1 |
| 2008/0277188 A1 | 11/2008 | Hauser et al. | |

FOREIGN PATENT DOCUMENTS

| | | |
|---|---|---|
| EP | 0151208 A | 8/1985 |
| EP | 418115 A1 | 3/1991 |
| WO | 2007/014030 A2 | 2/2007 |
| WO | 2008/005886 A2 | 1/2008 |
| WO | 2008/049025 A2 | 4/2008 |
| WO | 2010/011625 A2 | 1/2010 |

OTHER PUBLICATIONS

International Search Report completed on Feb. 12, 2008 with respect to International Publication No. WO 2008/005886 A3.

Communication Pursuant to Article 94(3) EPC dated Jun. 29, 2009 with regard to European Application No. 07 799 218.8.

International Preliminary Report on Patentability and Written Opinion of the International Searching Authority dated Jan. 13, 2009 issued with regard to PCT Application No. PCT/US2007/072567.

* cited by examiner

STEERING SYSTEM FOR A ZERO-TURN RADIUS VEHICLE

RELATED APPLICATIONS

This application is a divisional of U.S. patent application Ser. No. 13/224,801, filed on Sep. 2, 2011, which is a continuation of U.S. patent application Ser. No. 12/234,130, filed on Sep. 19, 2008 (now U.S. Pat. No. 8,011,678), which claims priority to U.S. Provisional Patent Application No. 60/973, 831, filed on Sep. 20, 2007. The contents of these applications are incorporated by reference herein in their entirety.

BACKGROUND OF THE INVENTION

This invention relates generally to a cable steering system for use with a zero-turn radius vehicle.

A zero-turn radius vehicle is one that is capable of turning about a vertical axis that passes through the center point of the axis of the drive wheels. Some zero-turn radius vehicles use independently controlled drive wheels to achieve zero-turn radius capability. For example, a first drive wheel is operated in a first direction while a second drive wheel is operated in the opposite direction thereby turning the vehicle around a vertical axis that passes through the center point between the drive wheels. Some such zero-turn radius vehicles use zero-turn hydrostatic transaxles (HZTs) which are also known in the art as described in commonly owned U.S. Pat. No. 6,775,976, the terms of which are incorporated herein by reference. Generally, an HZT is utilized to provide for independent control of each of the drive wheels of the vehicle. Other such zero-turn radius vehicles use electric drives, which are also known in the art, to power the drive wheels.

Cable steering is typically limited to turning the steerable wheels a maximum of 90 degrees from the forward position about a vertical axis. Thus, such systems are typically unsuitable for use with a zero-turn radius vehicle, which requires the steerable wheels to turn greater than 180 degrees in total.

SUMMARY OF THE INVENTION

The present invention comprises a steering apparatus for a zero-turn radius vehicle using a steering mechanism coupled to a first set of wheel assemblies by a plurality of cables. User input to the steering mechanism causes the cables to turn the first set of wheel assemblies about a vertical axis. Specifically, the cables link the steering mechanism to cam mechanisms that are attached to each wheel assembly. The design of the cam mechanism, which preferably includes two cams of varying radii, enables the two wheel assemblies to rotate about their vertical axes at varied degrees of rotation and greater than ninety degrees from the forward facing position, thereby resulting in zero-turn radius capability.

The steering apparatus disclosed herein may be used with electronics and controls that operate a set of hydrostatic devices or electric drives linked to a second set of wheels. In such an embodiment, a control device receives input from sensors measuring vehicle speed and steering wheel rotational position. These inputs are processed and used to control the rotational speed and direction of the second set of wheels via the hydrostatic devices or electric drives to achieve zero-turn radius steering. While the hydrostatic devices described herein are in the form of transaxles, the disclosed invention may be used with a variety of hydrostatic devices, including separate hydraulic pumps and hydraulic wheel motors, as would be understood by one of ordinary skill in the art. Alternatively, the disclosed invention could be used with electric motors used to independently drive the second set of wheels, either directly or through reduction gearing.

The steering system disclosed herein comprises a robust and cost-effective zero-turn radius steering system. A better understanding of the objects, advantages, features, properties and relationships of the invention will be obtained from the following detailed description and accompanying drawings which set forth illustrative embodiments that are indicative of the various ways in which the principles of the invention may be employed.

BRIEF DESCRIPTION OF THE DRAWINGS

For a better understanding of the invention, reference may be had to preferred embodiments shown in the following drawings in which:

FIG. 6-A depicts an exploded perspective view of the cam mechanisms and caster wheel assemblies shown in FIG. 3 that are located on the left side of the vehicle;

DETAILED DESCRIPTION

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

Figure 1:
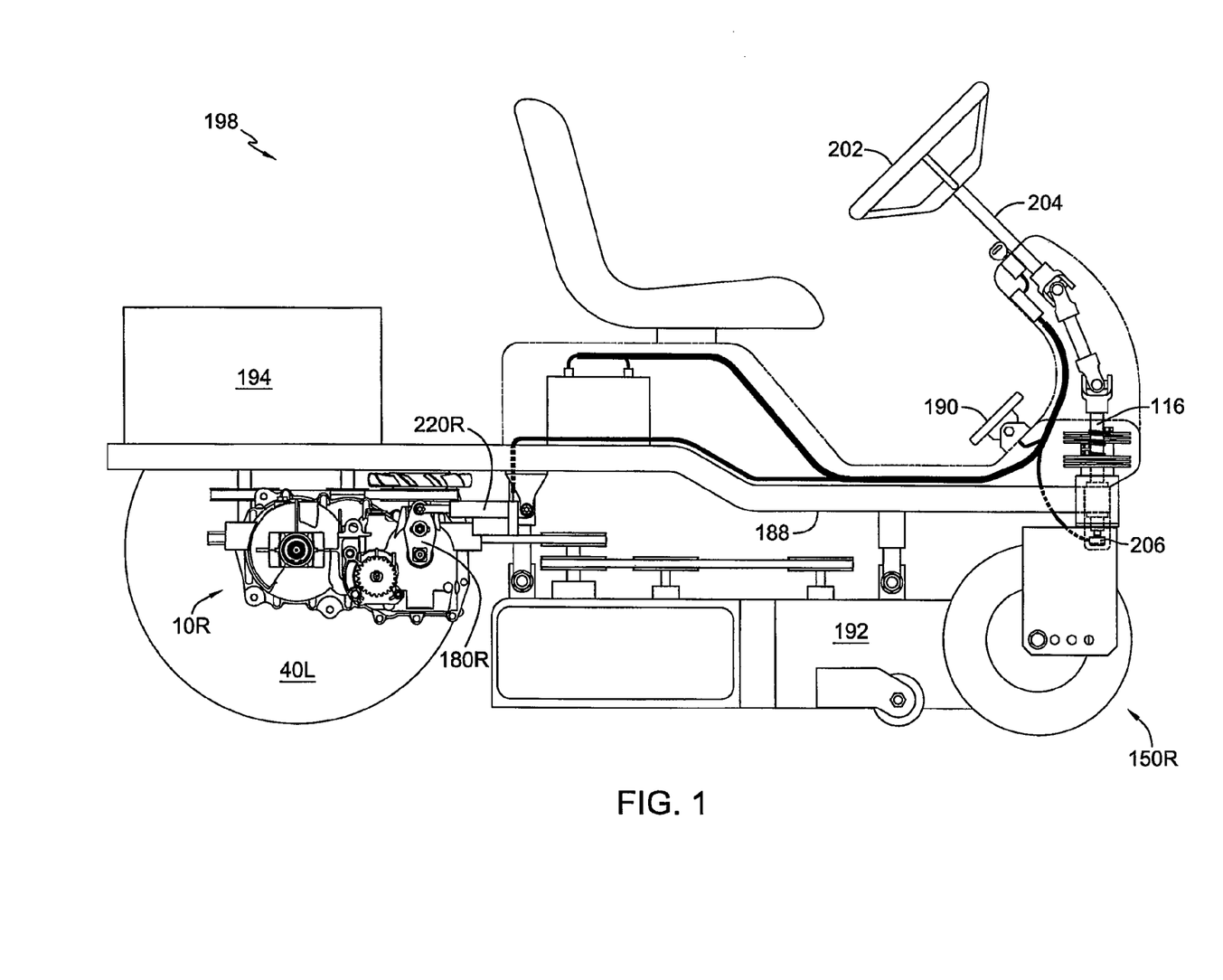
FIG. 1 illustrates a side view of a vehicle incorporating an exemplary zero-turn radius cable steering system.
Figure 2:
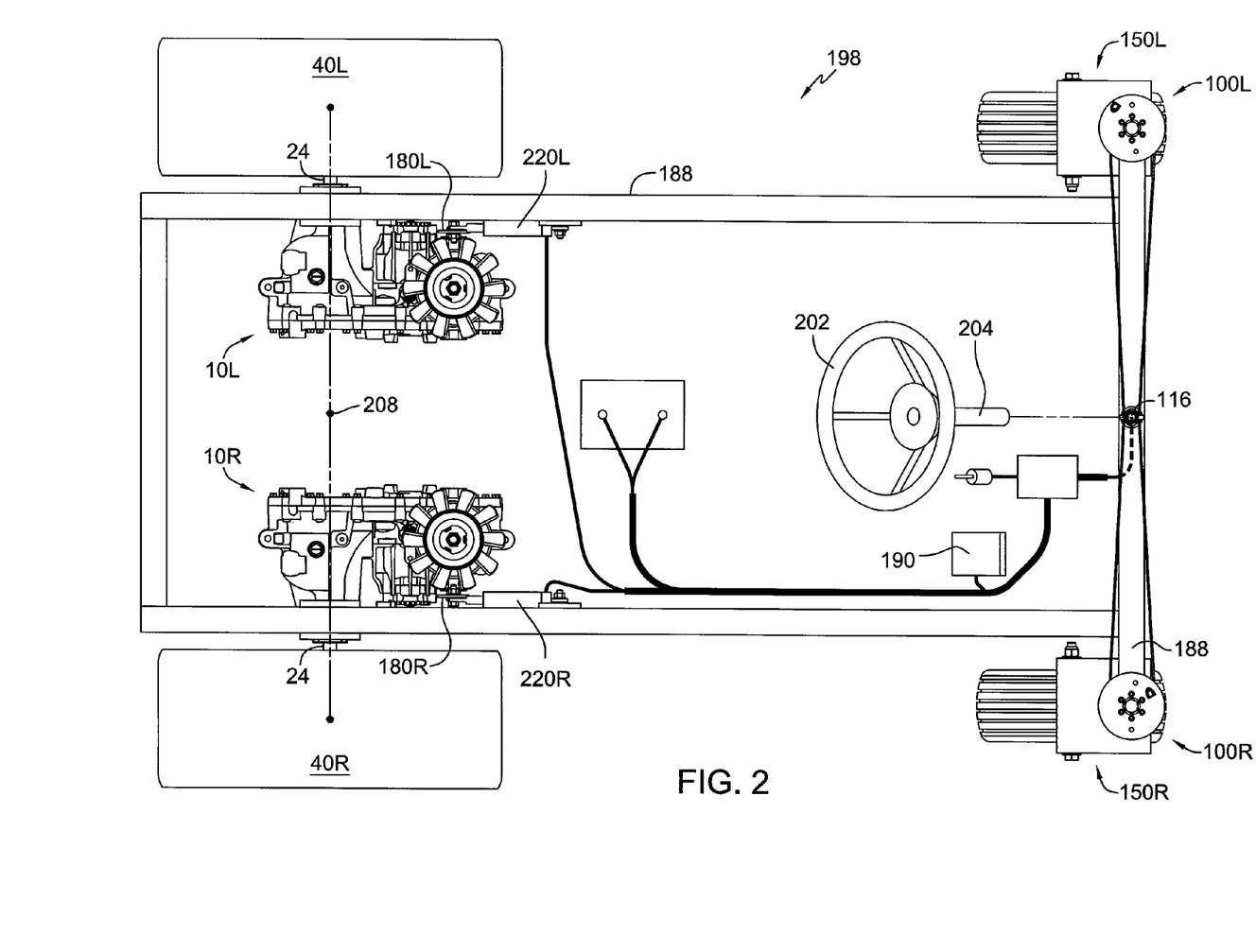
FIG. 2 depicts a plan view of the vehicle embodiment shown in FIG. 1 with certain elements removed for clarity.

FIGS. 1 through 9 illustrate a first embodiment of a steering system in accordance with the principles of the present invention. FIGS. 1 and 2 show a vehicle 198, which includes a prime mover 194, a frame 188 and a mower deck 192.

Although a mowing vehicle is shown in FIGS. 1 and 2, the present invention can be applied to other vehicle types as well.

Vehicle 198 also includes a pair of transaxles or transmissions 10L and 10R that drive output shafts 24. The transaxles depicted in the figures are shown in more detail in commonly owned U.S. Pat. No. 6,775,976. Output shafts 24, in turn, each drive one of a pair of drive wheels 40L and 40R that provide motion to vehicle 198. Alternatively, a single transaxle capable of driving the drive wheels in opposite rotational directions may be used. While the embodiments shown and described herein utilize hydrostatic transmissions, this invention is also applicable to other types of drive systems, such as, for example, hydraulic drive systems with a variable pump and/or motor or mechanical drive systems, such as continuously variable drive systems, continuously variable transmissions (CVTs), toroidal transmissions and the like and electric drive systems. Accordingly, the terms "transmission" and "transaxle" are used herein for convenience or in an exemplary manner and are not used to limit the present invention. While the embodiments shown and described herein utilize a rear wheel drive vehicle with front wheel steering, it should be understood that a front wheel drive vehicle using rear wheel steering is within the scope of the invention.

The vehicle shown in FIGS. 1 and 2 has a steering mechanism, including the steering input device shown as steering wheel 202 and steering column 204, to facilitate the steering of vehicle 198. In a particular embodiment, steering wheel 202 connects to steering column 204, which is coupled to steering shaft 116. Steering column 204 may contain linkages or other mechanisms that would be known to one of skill in the art such that rotation of steering wheel 202 causes rotation of steering shaft 116. An equivalent hand or foot-operated steering input device may be used in lieu of steering wheel 202 and steering column 204.

Figure 3:
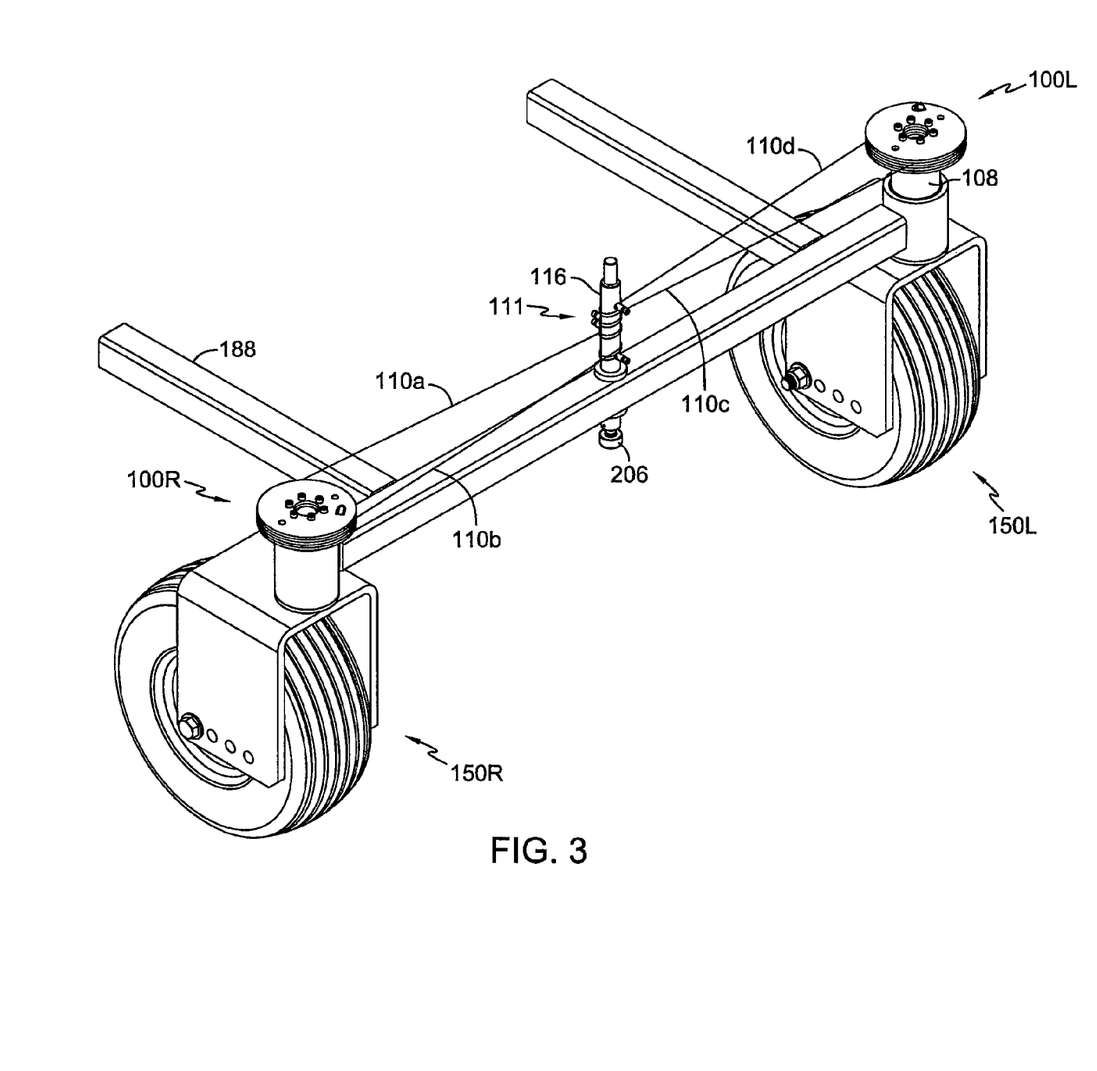
FIG. 3 illustrates a perspective view of an embodiment of a zero-turn radius cable steering system in accordance with the present invention.

As shown in FIG. 3, steering shaft 116 is rotatably mounted on vehicle frame 188. Steering shaft 116 may be connected to a steering position sensor 206 that detects the rotational position of the steering shaft. Steering position detector 206 may be a potentiometer or other known sensor device able to measure the rotational position of steering shaft 116. Steering position sensor 206 is shown in FIG. 3 located below vehicle frame 188 relative to the ground and at an end of the steering shaft 116; however, it may be located at other positions on steering shaft 116 or on steering column 204.

Figure 8:
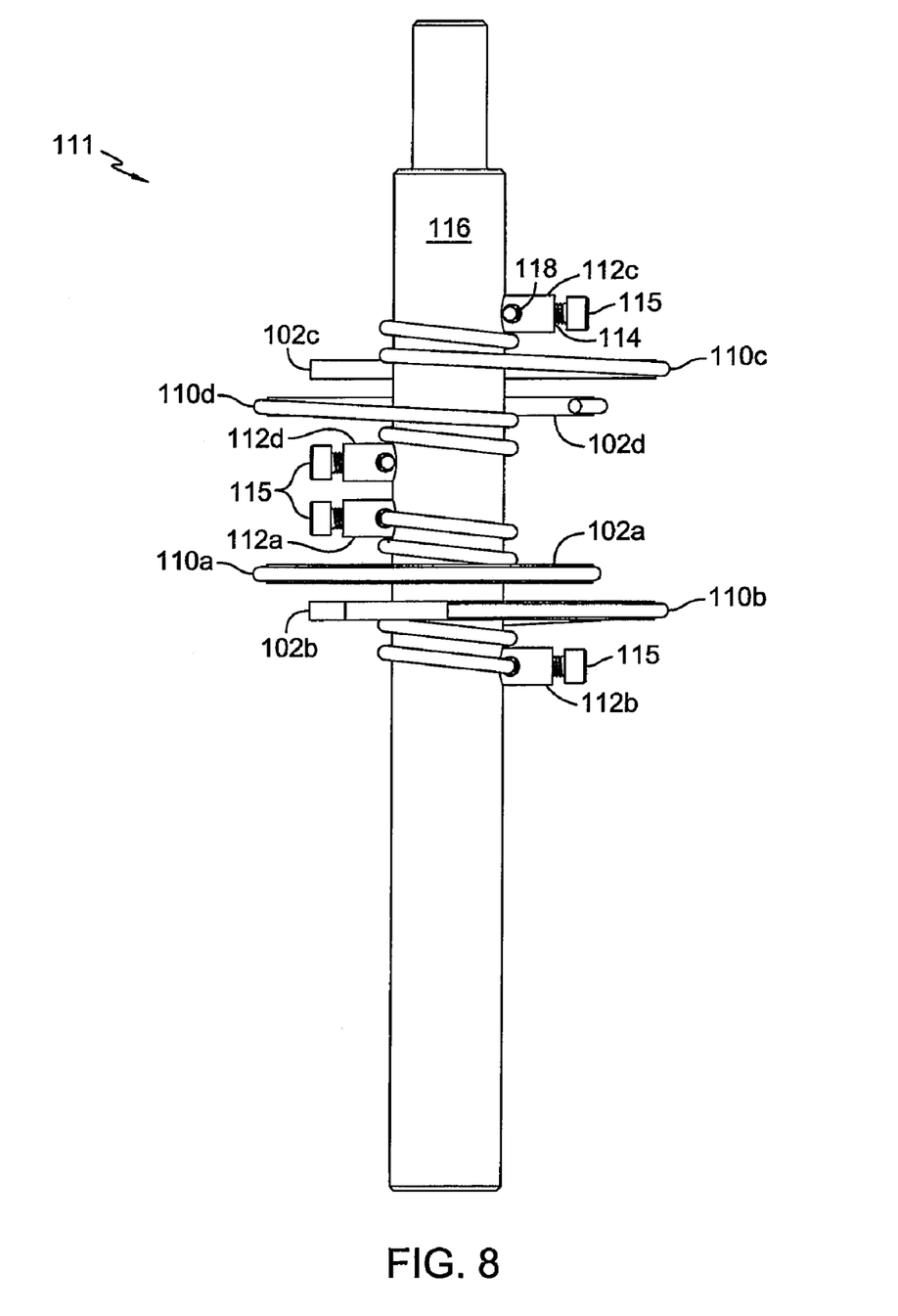
FIG. 8 depicts a side elevation view of a steering shaft assembly and cams of the zero-turn radius cable steering system shown in FIG. 3, with certain elements removed for clarity.

As shown in FIG. 3, steering shaft 116 is coupled to cam mechanisms 100L and 100R via cables 110a-d. Although cables are shown, belts or other suitable flexible elongated members may be used and are encompassed within the scope of this invention. The term "cable" is used herein for convenience and not to limit the scope of the invention. Cables 110a-d are each wrapped around steering shaft 116 and first ends of cables 110a-110d are anchored through one of a plurality of cable mounts 112 which extend from steering shaft 116. In one embodiment, as shown in FIG. 8, cable mounts 112 are cylindrical shafts having axes perpendicular to the axis of steering shaft 116. Each cable mount 112a-d further includes an opening 118 consisting of a cylindrical bore formed in cable mounts 112a-d. Each opening 118 has an axis perpendicular to the axis of each respective cable mount 112a-d and the first ends of cables 110a-110d pass through a respective opening 118. Each cable mount 112 further includes an axial bore 114 along the axis of the cable mount and intersecting opening 118. Axial bore 114 may be internally threaded and receives a cable fastener, shown in FIG. 8 as threaded cable fastener 115, thereby permitting adjustment of the first ends of cables 110a-110d relative to their cable mount 112. Tightening of cable fastener 115 to cable mount 112 causes cable fastener 115 to clamp cable 110 between the end of cable fastener 115 and the wall of opening 118 such that cable 110 is fixedly retained relative to cable mount 112 and cable fastener 115. Alternatively, an intermediary device (not shown) may be placed between the end of cable fastener 115 and cable 110 to provide improved contact between cable 110 and cable fastener 115 and, thus increased retention of cable 110. The structure of the cable mounts described herein is merely exemplary and other structures for attaching the cables to the steering mechanism, as would be obvious to one skilled in the art, are within the scope of the invention.

Figure 6:
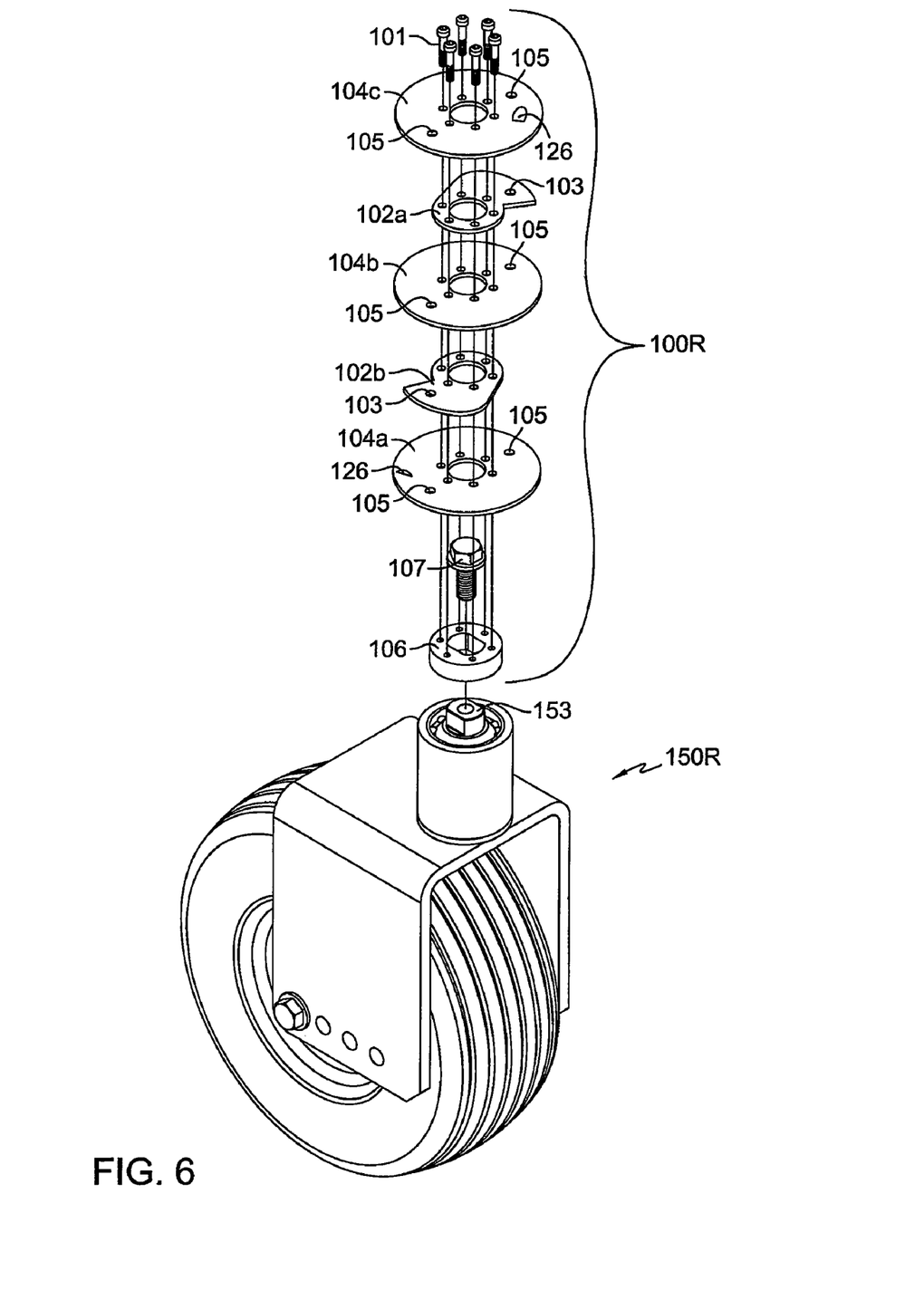
FIG. 6 depicts an exploded perspective view of the cam mechanisms and caster wheel assemblies shown in FIG. 3 that are located on the right side of the vehicle.

As shown in FIGS. 3, 6 and 6-A cam mechanisms 100L and 100R are non-rotatably connected to caster wheel assemblies 150L and 150R, respectively. Each caster wheel assembly 150 is rotatably mounted to vehicle frame 188 about a generally vertical axis. Thus, rotation of steering shaft 116 causes cables 110 to transfer the rotational force from steering shaft 116 to cam mechanisms 100L and 100R, thereby rotating cam mechanisms 100L and 100R and caster wheel assemblies 150L and 150R about their respective, generally vertical axes.

Figure 7:
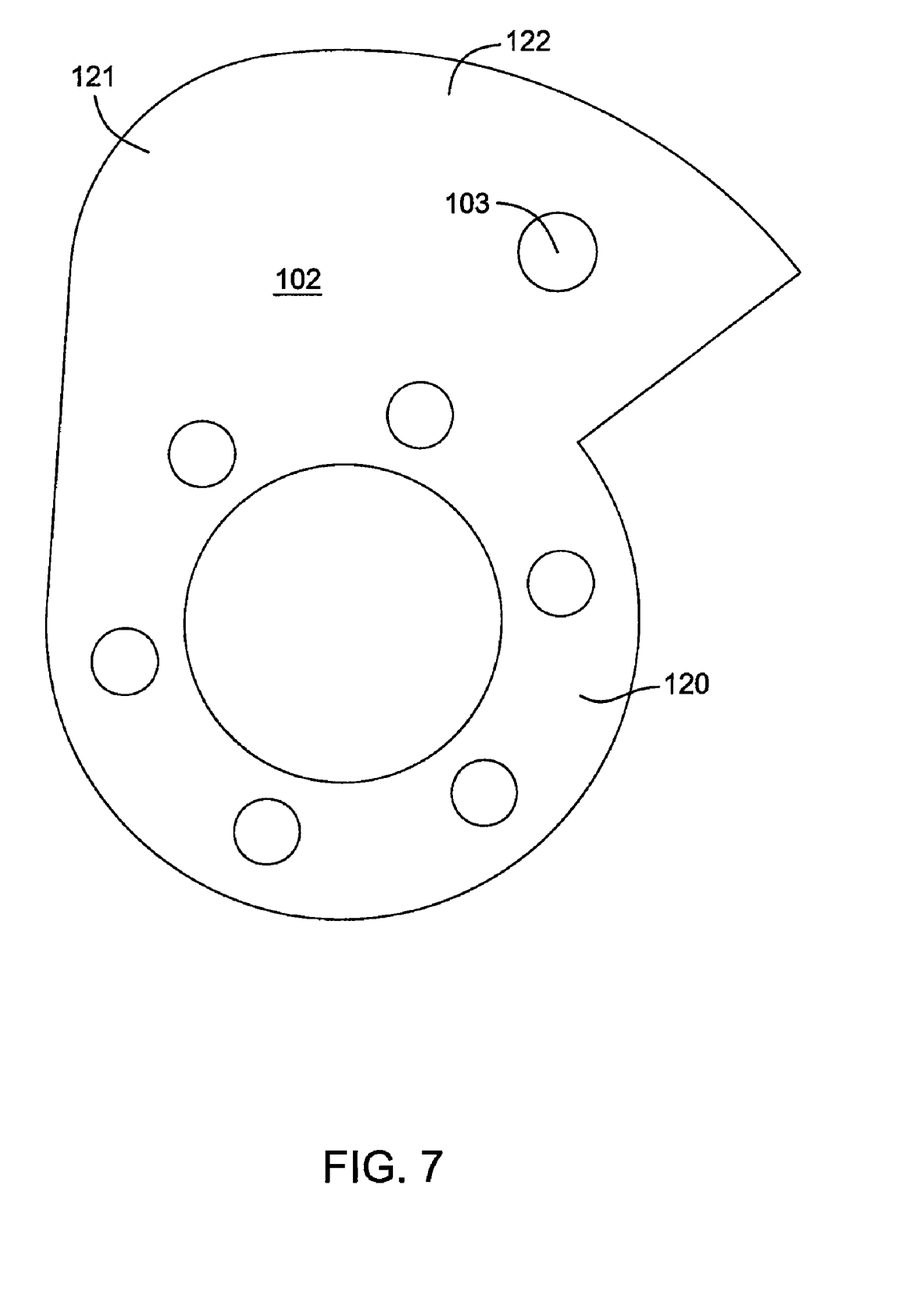
FIG. 7 depicts a plan view of one of the cams shown in the cam mechanism in FIG. 6.

Each cam assembly 100 has at least two cams 102. As shown in FIG. 7, cams 102 have a first portion 120 having a first radius and a second portion 122 having a second radius that is generally greater than the first radius. Cams 102 further have a transition portion 121 having a varied radius that transitions from the first portion to the second portion. The shape of cams 102 enables the cable steering mechanism to achieve zero-turn radius capability by enabling one caster wheel assembly (e.g., 150L) to rotate further than the other caster wheel assembly (e.g., 150R) during a turn. Advantageously, cams 102 may optionally be configured so that caster wheel assemblies 150L and 150R can turn greater than 180 degrees in total.

Figure 4:
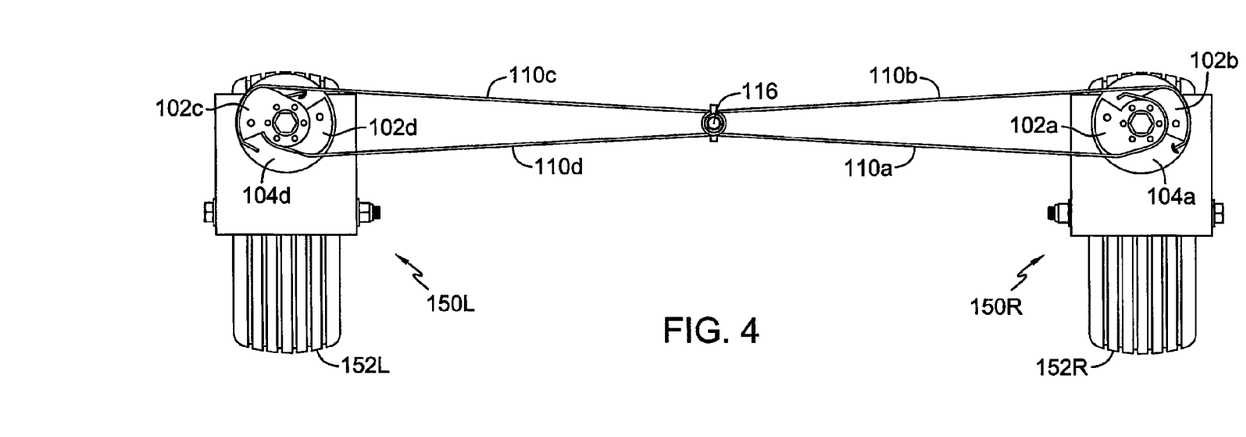
FIG. 4 depicts a plan view of portions of the embodiment of the zero-turn radius cable steering system shown in FIG. 3, with certain elements removed for clarity.
Figure 5:
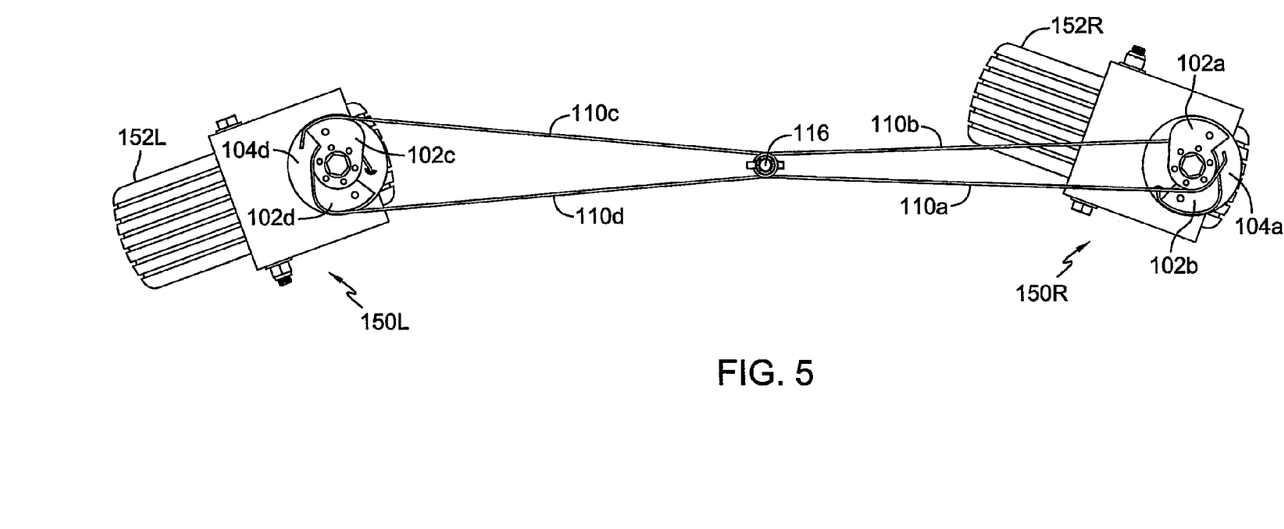
FIG. 5 depicts a plan view of portions of the embodiment of the zero-turn radius cable steering system shown in FIG. 3 during a right-hand zero-turn radius turn, with certain elements removed for clarity.

FIGS. 4 and 5 show one embodiment of a zero-turn radius cable steering system. FIG. 4 shows the steering system including the cam assemblies in position for forward vehicle travel without turning. FIG. 5 shows the steering system during the execution of a zero-turn radius right hand turn.

As shown in FIG. 5, steering shaft 116 is turned clockwise during a right hand turn. Turning steering shaft 116 clockwise causes cables 110b and 110d to unwrap from steering shaft 116 and causes cables 110a and 110c to wrap around steering shaft 116. Wrapping cable 110c around steering shaft 116 causes cable 110c to exert a rotational force on cam 102c and rotates cam 102c and cam mechanism 100L clockwise when viewed from above the vehicle, thereby turning caster wheel assembly 150L clockwise about its vertical axis. The rotation of cam mechanism 100L permits cable 110c to unwrap from cam 102c. The rotation of cam 102c, and consequently cam mechanism 100L, causes cam 102d to rotate and causes cable 110d to wrap around cam 102d as cable 110d is unwound from steering shaft 116. Simultaneously, cable 110a is wound around steering shaft 116, causing cable 110a to exert a rotational force on cam 102a, thereby causing cam 102a and cam mechanism 100R to rotate. The rotation of cam mechanism 100R and consequently cam 102b causes cable 110b to wrap around cam 102b and permits cable 110a to unwrap from cam 102a. The rotation of cam mechanism 100R causes caster wheel assembly 150R to turn clockwise when viewed from above the vehicle on its vertical axis.

As shown in FIG. 5, caster wheel assembly 150L and caster wheel 152L are located at the outer radius of a right hand turn and caster wheel assembly 150R and caster wheel 152R are located at the inner radius of a right hand turn. When steering shaft 116 is turned clockwise, cables 110c and 110d, which are coupled to caster wheel assembly 150L at the outer radius of the turn, are wound around and unwound from the second portions 122 of cams 102c and 102d. Simultaneously, cables 110a and 110b, which are connected to the caster wheel assembly 150R at the inner radius of the turn, are wound around and unwound from the first portions 120 of cams 102a and 102b. Because the second portions 122 of the cams have a larger radius than the first portions 120 of the cams, the winding of cables 110c and 110d around the second portions of cams 102c and 102d, which are connected to the outer caster wheel assembly 150L, and the winding of cables 110a and 110b around the first portions of cams 102a and 102b, which are connected to the inner caster wheel assembly 150R, cause the inner caster wheel assembly 150R to rotate about its vertical axis more than the outer caster wheel assembly 150L rotates about its vertical axis, thereby facilitating a zero radius turn.

The shape of the cams, including transition portions 121, is designed such that during a zero-radius turn, lines extending along the axes of each of the caster wheels 152L and 152R would intersect on the axis of the two drive wheels 40L and 40R and at the center point 208 between drive wheels 40L and 40R thereby enabling zero-turn radius steering. Furthermore, the cams may optionally be configured to enable each caster wheel assembly 150L and 150R to turn greater than 180 degrees.

The radius of steering shaft 116 may be sized relative to the radii of the cams 102a-d to adjust the sensitivity of the steering, thereby providing for a signature steering responsiveness or "feel." For example, in one embodiment, the steering shaft may be sized such that one and a half rotations of the steering shaft, lock-to-lock, result in full rotation of the cam mechanisms 100L and 100R and the respective caster wheels 152L and 152R. In embodiments having a steering shaft sized such that the steering shaft is capable of greater than 360 degrees of rotation, a multi-turn potentiometer may be used to measure such rotation.

FIGS. 6 and 6-A show additional detail of one embodiment of cam mechanisms 100L and 100R, respectively. As shown in FIG. 6 the cam mechanism 100R includes a top spacing disk 104c, a middle spacing disk 104b, and a bottom spacing disk 104a. Cam 102a is positioned between top spacing disk 104c and middle spacing disk 104b and cam 102b is positioned between middle spacing disk 104b and bottom spacing disk 104a. Cams 102a and 102b may be positioned such that the second portion 122 of cam 102a is generally opposite the second portion 122 of cam 102b and such that the transition portions 122 of cams 102a and 102b are positioned opposite each other. Spacing disks 104a-c and cams 102a and 102b may have a plurality of bores through which fasteners 101 pass, thereby preventing rotation of cams 102a and 102b and the spacing disks 104a-c relative to one another. Cam mechanism 100R may further include a spacer 106 which has a plurality of bores through which fasteners 101 pass, thereby preventing rotation of spacer 106 relative to cams 102a and 102b and spacing disks 104a-c. As shown in FIG. 6-A, cam mechanism 100L is similarly configured to cam mechanism 100R with the exception of spacer 108. Spacer 108 varies in height from spacer 106 to enable configuration of steering cables 110 as shown in FIG. 3.

As shown in FIG. 6, cams 102 may have cam alignment bores 103 passing through cams 102 and generally perpendicular to the horizontal plane of cams 102. Spacing disks 104 may have spacing disk alignment bores 105 that pass through spacing disks 104 and that are generally perpendicular to the horizontal plane of spacing disks 104. Cam alignment bores 103 and spacing disk alignment bores 105 are used to align cams 102 and spacing disks 104 during assembly of cam mechanism 100. Spacing disks 104 and cams 102 may be placed on an assembly fixture having posts that pass through cam alignment bores 103 and spacing disk alignment bores 105, thereby ensuring that cams 102 are properly aligned relative to one another as described above and as shown in FIG. 6. Cam alignment bores 103 and spacing disk alignment bores 105 further assist in assembly of cam mechanism 100 to align the bores through which fasteners 101 pass.

As shown in FIG. 6, spacing disks 104a-c and cams 102a and 102b may further have center holes through which a caster fastener, shown in FIG. 6 as bolt 107, can pass. In one embodiment, spacer 106 has a non-cylindrical bore with a cross sectional geometry substantially similar to the cross sectional geometry of a post portion 153 of caster wheel assembly 150R. The engagement of the non-cylindrical bore in spacer 106 to post portion 153 of caster wheel assembly 150S connects cam mechanism 100R to caster wheel assembly 150R such that rotation of cam mechanism 100R causes caster wheel assembly 150R to rotate. Post portion 153 of caster wheel assembly 150R may further have a threaded bore for receiving caster fastener 107, which secures cam mechanism 100R to caster wheel assembly 150R. Cam mechanism 100L and castor wheel assembly 150L are similarly configured.

Spacing disks 104 have a radius greater than the maximum radius of cams 102 so that spacing disks 104 prevent cables 110 from slipping from the edge of cams 102. Alternatively, or additionally, cams 102 may be configured to have a groove on the periphery of each cam of sufficient depth so that cables 110 do not slip from cams 102. In an alternative embodiment, cam mechanisms 100, or portions thereof, may be unitary components instead of assemblies.

Figure 9:
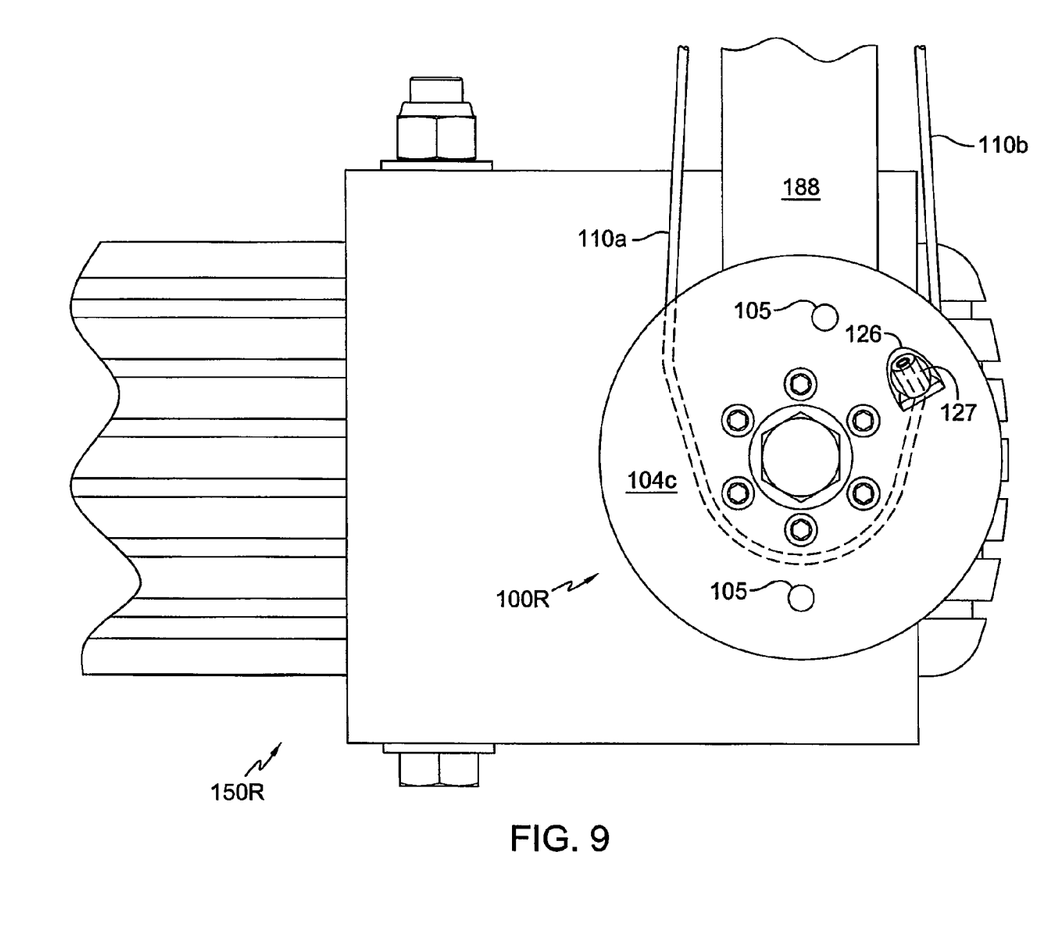
FIG. 9 depicts a plan view of one of the cam assemblies and caster wheel assemblies shown in FIG. 6.

Spacing disks 104a and 104c each further include cable bores 126, through which one of the cables 110a and 110b pass, thereby anchoring the second end of cables 110a and 110b to cam assembly 100R. Specifically, the second end of each cable 110a extends through cable bore 126 in spacing disk 104c and is secured by a clamp 127 thereby retaining the second end of cable 110a to the cam assembly 100R. Similarly, cable 110b extends through cable bore 126 in spacing disc 104a and is secured by clamp 127. As shown in FIG. 9 clamp 127 is a device that is crimped onto cables 110a and 110b; however, other retaining devices known in the art may be used. Clamp 127 is positioned on cables 110a and 110b such that the cables are under tension. Cables 110c and 110d are similarly attached to cam mechanism 100L and spacing discs 104d and 104f.

FIG. 8 is a side view of the steering shaft assembly 111, cams 102a-d and cables 110a-d, and provides further detail of the configuration and interaction of these components. In this embodiment, the first end of cable 110c originates at cable mount 112c, which may be positioned near the top of the steering shaft 116 relative to the ground. Cable 110c is then wrapped around steering shaft 116. Cable 110c then extends toward the left side of the vehicle and wraps around at least a portion of cam 102c, which may be positioned slightly lower with respect to the ground than cable mount 112c. The second end of cable 110c is anchored to spacing disc 104f as described above.

The first end of cable 110d originates at cable mount 112d. Cable 110d is wrapped around steering shaft 116 and extends toward the left side of the vehicle and wraps around at least a portion of cam 102d. The second end of cable 110d is anchored to spacing disc 104d as shown in FIG. 4. Cam 102d may be positioned above cable mount 112d and below cam 102c relative to the ground, as shown in FIG. 3. The first end of cable 110a originates at cable mount 112a, which may be positioned below cable mount 112d relative to the ground. Cable 110a is wrapped around steering shaft 116 and extends toward the right side of the vehicle where it wraps around at least a portion of cam 102a. The second end of cable 110a is anchored to spacing disc 104c, as shown in FIG. 9.

The first end of cable 110b originates at cable mount 112b, which may be positioned below cable mount 112a and cam 102a relative to the ground. Cable 110b is wrapped around steering shaft 116 and extends toward the right side of the vehicle where it wraps around at least a portion of cam 102b. The second end of cable 110b is anchored to spacing disc 104a. The exact position of the cams, cable mounts and cables described above is merely exemplary and it should be understood that these positions and configurations can be modified within the scope of the invention.

In an alternative embodiment, two cables may be used instead of four. In this embodiment, a first end of the first cable originates at spacing disc 104a, to which it is anchored. The first cable is partially wrapped around cam 102b and extends toward steering shaft 116, to which a medial portion of the first cable is anchored. The medial portion of the first cable is wrapped around steering shaft 116 both before and after its anchor point. The first cable may be anchored to the steering shaft by a cable mount 112. From steering shaft 116, the first cable extends toward cam 102c around which the second end of the first cable is partially wrapped. The second end of the first cable is anchored to spacing disc 104f. A first end of the second cable originates at spacing disc 104c, to which it is anchored. The second cable wraps partially around cam 102a. The second cable extends toward steering shaft 116, to which the medial portion of the second cable is anchored. The second cable is also wrapped around steering shaft 116 both before and after its anchor point. The second cable extends away from steering shaft 116 and toward cam 102d, around which it is partially wrapped. The second end of the second cable is anchored to spacing disc 104d. Alternatively, a first cable could link cams 102a and 102b to steering shaft 116 and a second cable could link cams 102c and 102d to steering shaft 116.

The cable steering apparatus described above may be used in conjunction with an electronic drive control system as shown in FIGS. 1 and 2 and more fully described in commonly assigned U.S. Pat. No. 7,073,330 and pending U.S. patent application Ser. No. 11/771,559, which are herein incorporated by reference in their entirety. An electronic drive control system may receive an input from steering position sensor 206, indicating the rotation of steering shaft 116. The electronic drive control system may also receive an input from a speed input sensor such as a sensor linked to accelerator 190 and/or a sensor linked to a brake pedal (not shown). The electronic drive control system may receive input for wheel or axle speed and/or acceleration from sensors linked to the axles of the rear wheels. The electronic drive control system may include input to detect whether the user has selected to drive the vehicle in a forward direction or in a reverse direction. The electronic drive control system may also receive input from sensors that measure actuator position. Such features are fully described in commonly assigned U.S. Pat. No. 7,073,330 and pending application Ser. No. 11/771,559.

Based on such inputs, the electronic drive control system controls the speed of wheels 40L and 40R via hydrostatic transaxles 10L and 10R which are controlled via actuators 220. Actuators 220 are each respectively drivingly attached to a control arm 180 of each transmission 10L and 10R. External linear actuators 220 are shown, but rotary actuators, which are also known, may be substituted and drivingly attached to control arms 180. Optionally, internal actuators or electrically controlled proportional valves may be used in lieu of external actuators 220. Each transmission 10L and 10R may be a configuration similar to that disclosed in U.S. Pat. No. 6,775,976. In the transmission disclosed in that patent, the transmission control arm is connected to a swash plate mechanism that is adjustable to control the direction and amount of fluid flow from a hydraulic pump to a hydraulic motor. This arrangement allows the speed of each transmission 10L and 10R to be adjustable by adjusting each individual actuator 220L and 220R. Accordingly, vehicle 198 may be steered in part and driven in a forward or reverse direction by varying the speed of each individual transmission 220L and 220R. Alternatively, electric drive motors (not shown) may be used to vary the rotational speed and direction of the drive wheels.

The electronic drive control system varies the power directed to drive wheels 40L and 40R depending upon the steering angle of vehicle 198. As the turn angle increases, the electronic drive control system directs more power to the outer rear wheel and less power to the inner rear wheel. When the turn angle is increased so that the center point of the turn is located at the inner rear wheel, the inner rear wheel is stopped and the power is only provided to the outer rear wheel. When the turn angle is increased further, such that the center point of the vehicle's rotation is located between the rear wheels, the direction of the inner rear wheel is reversed relative to the direction of the outer rear wheel. These features of the electronic drive control system are more fully described in commonly owned U.S. Pat. No. 7,073,330 and pending U.S. patent application Ser. No. 11/771,559, published as 2008-0018269.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A cam mechanism for use with a cable steering apparatus, comprising:
    first and second cams having a common axis of rotation, each of the first and second cams comprising:
        a first portion having a first radius;
        a second portion having a second radius greater than the first radius; and
        a transition portion located between the first portion and the second portion;
    wherein the transition portion of the first cam is generally located 180 degrees opposite the transition portion of the second cam with respect to the common axis of rotation; and
    first, second and third spacing disks each having a radius greater than the radius of the second portion of the first and second cams, the first spacing disk mounted to the first cam and located above the first cam relative to the ground, the second spacing disk mounted to the first cam and second cam and located below the first cam and above the second cam relative to the ground, and the third spacing disk mounted to the second cam and located below the second cam relative to the ground.

2. The cam mechanism of claim 1, wherein the first and second cams each comprise an alignment bore passing therethrough, thereby enabling alignment of the first and second cams during assembly of the cam mechanism.

3. The cam mechanism of claim 2, wherein the first spacing disk comprises a first cable bore intersecting a horizontal plane of the first spacing disk and the third spacing disk comprises a second cable bore intersecting the horizontal plane of the third spacing disk.

4. The cam mechanism of claim 2, wherein the first, second and third spacing disks each further comprise an alignment bore passing therethrough, thereby enabling alignment of the first, second and third spacing disks during assembly of the cam mechanism.

5. The cam mechanism of claim 1, further comprising a spacer mounted to the third spacing disk.

6. The cam mechanism of claim 5, wherein the spacer comprises a non-circular bore.

7. The cam mechanism of claim 1, wherein the first and second cams and the first, second and third spacing disks are each attached to one another via a plurality of threaded fasteners passing through each of the first and second cams and the first, second and third spacing disks.

8. The cam mechanism of claim 1, wherein the first and second cams and the first, second and third spacing disks each have a center hole through which the axis of rotation passes.

9. A vehicle comprising:
first and second wheel assemblies, the first and second wheel assemblies each comprising a wheel and a cam mechanism, the cam mechanisms of the first and second wheel assemblies each comprising:
first and second cams having a common axis of rotation, each of the first and second cams comprising:
a first portion having a first radius;
a second portion having a second radius greater than the first radius; and
a transition portion located between the first portion and the second portion;
wherein the transition portion of the first cam is generally located 180 degrees opposite the transition portion of the second cam with respect to the common axis of rotation; and
first, second and third spacing disks each having a radius greater than the radius of the second portion of the first and second cams, the first spacing disk mounted to the first cam and located above the first cam relative to the ground, the second spacing disk mounted to the first cam and second cam and located below the first cam and above the second cam relative to the ground, and the third spacing disk mounted to the second cam and located below the second cam relative to the ground; and
a steering shaft rotatably disposed on the vehicle and connected to the first and second wheel assemblies via a plurality of cables, wherein rotation of the steering shaft causes the wheels of the first and second wheel assemblies to be steered.

10. The vehicle of claim 9, wherein the first and second cams each comprise an alignment bore passing therethrough, thereby enabling alignment of the first and second cams during assembly of the cam mechanism.

11. The vehicle of claim 9, further comprising a spacer mounted to the third spacing disk.

12. The vehicle of claim 11, wherein the spacer comprises a non-circular bore.

13. The vehicle of claim 12, wherein the first spacing disk comprises a first cable bore intersecting a horizontal plane of the first spacing disk and the third spacing disk comprises a second cable bore intersecting the horizontal plane of the third spacing disk.

14. A cam mechanism for use with a cable steering apparatus, comprising:
a first cam comprising:
a first portion having a first radius and an axis of rotation;
a second portion having a second radius greater than the first radius;
a transition portion located between the first portion and the second portion; and
a perimeter surface generally parallel to the axis of rotation, for receiving a first cable;
a second cam sharing the same axis of rotation as the first cam, the second cam comprising:
a first portion having a third radius;
a second portion having a fourth radius greater than the third radius;
a transition portion located between the first portion and the second portion; and
a perimeter surface generally parallel to the axis of rotation, for receiving a second cable;
wherein the transition portion of the first cam is generally located 180 degrees opposite the transition portion of the second cam with respect to the common axis of rotation;
a first surface generally perpendicular to the common axis of rotation and adjacent the first cam, wherein the first surface extends radially beyond the perimeter surface of the first cam, thereby positioning part of the first cable on the perimeter surface of the first cam;
a second surface generally perpendicular to the common axis of rotation, adjacent the first cam and opposite the first surface, wherein the second surface extends radially beyond the perimeter surface of the first cam, thereby positioning part of the first cable on the perimeter surface of the first cam;
a third surface generally perpendicular to the common axis of rotation and adjacent the second cam, wherein the third surface extends radially beyond the perimeter surface of the second cam, thereby positioning part of the second cable on the perimeter surface of the second cam; and
a fourth surface generally perpendicular to the common axis of rotation, adjacent the second cam and opposite the third surface, wherein the fourth surface extends radially beyond the perimeter surface of the second cam, thereby positioning part of the second cable on the perimeter surface of the second cam.

15. The cam mechanism of claim 14, further comprising:
a first cable bore for receiving the first cable; and
a second cable bore for receiving the second cable.

16. A vehicle comprising:
first and second wheel assemblies, each of the first and second wheel assemblies comprising a wheel and a cam mechanism, each cam mechanism of the first and second wheel assemblies comprising:
a first cam comprising:
a first portion having a first radius and an axis of rotation;
a second portion having a second radius greater than the first radius;
a transition portion located between the first portion and the second portion; and
a perimeter surface generally parallel to the axis of rotation, for receiving a first cable;
a second cam sharing the same axis of rotation as the first cam, the second cam comprising:
a first portion having a third radius;
a second portion having a fourth radius greater than the third radius;

a transition portion located between the first portion and the second portion; and a perimeter surface generally parallel to the axis of rotation, for receiving a second cable;

wherein the transition portion of the first cam is generally located 180 degrees opposite the transition portion of the second cam with respect to the common axis of rotation;

a first surface generally perpendicular to the common axis of rotation and adjacent the first cam, wherein the first surface extends radially beyond the perimeter surface of the first cam, thereby positioning part of the first cable on the perimeter surface of the first cam;

a second surface generally perpendicular to the common axis of rotation, adjacent the first cam and opposite the first surface, wherein the second surface extends radially beyond the perimeter surface of the first cam, thereby positioning part of the first cable on the perimeter surface of the first cam;

a third surface generally perpendicular to the common axis of rotation and adjacent the second cam, wherein the third surface extends radially beyond the perimeter surface of the second cam, thereby positioning part of the second cable on the perimeter surface of the second cam; and a fourth surface generally perpendicular to the common axis of rotation, adjacent the second cam and opposite the third surface, wherein the fourth surface extends radially beyond the perimeter surface of the second cam, thereby positioning part of the second cable on the perimeter surface of the second cam; and a steering shaft rotatably disposed on the vehicle and connected to the first and second wheel assemblies via a plurality of cables, wherein rotation of the steering shaft causes the wheels of the first and second wheel assemblies to be steered.

17. The vehicle of claim 16, wherein each cam mechanism further comprises:

a first cable bore for receiving the first cable; and a second cable bore for receiving the second cable.

18. The vehicle of claim 16, further comprising a first motor driving a first drive wheel and a second motor driving a second drive wheel.

19. The vehicle of claim 18, further comprising an electronic drive control system communicatively connected to the first motor and second motor to control the rotational speed and direction of the first and second drive wheels.

* * * * *